June 2, 1925.  1,540,181
H. OLSON
VALVE FOR CYLINDERS
Filed Nov. 6, 1924
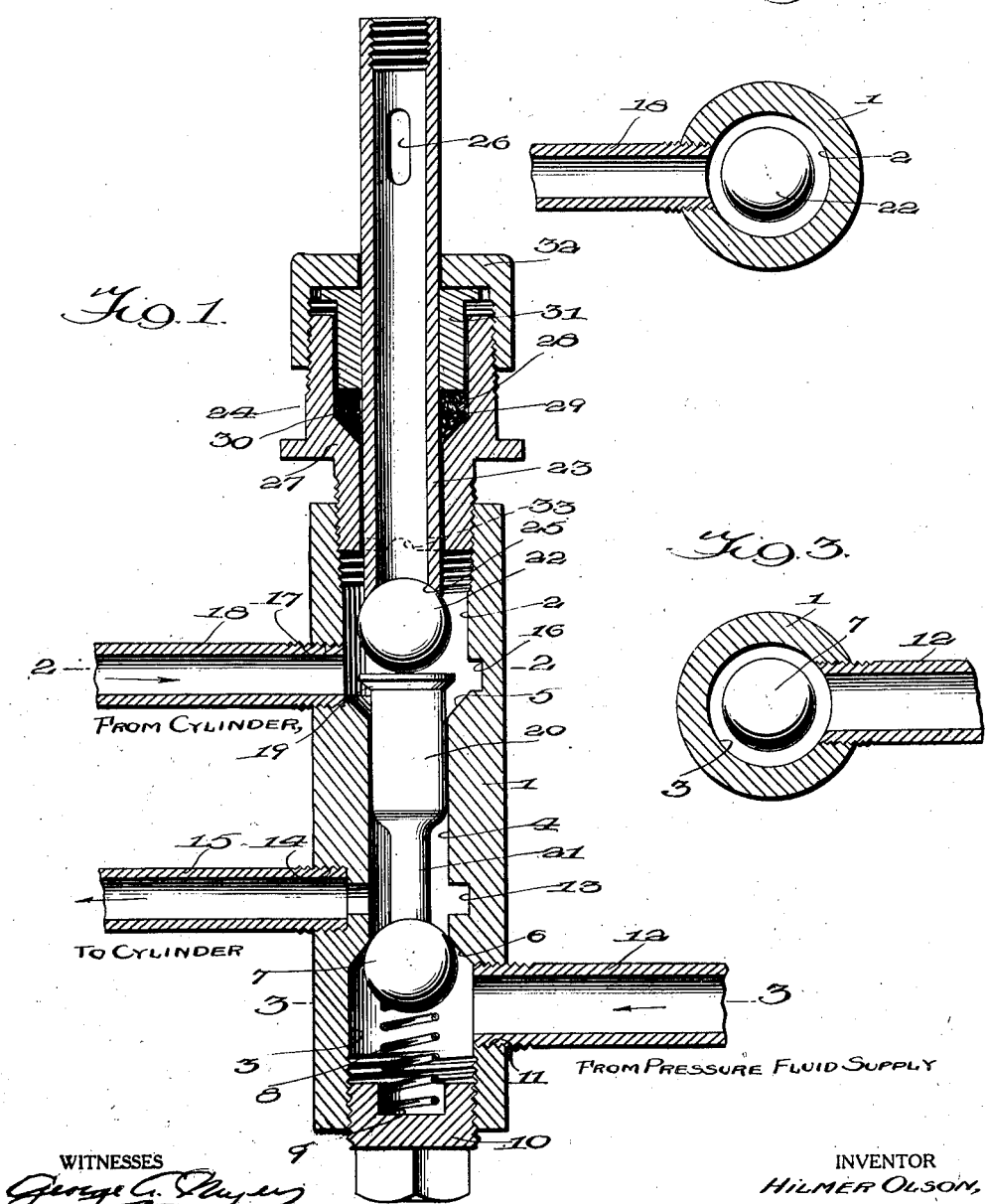

Patented June 2, 1925.

1,540,181

UNITED STATES PATENT OFFICE.

HILMER OLSON, OF HOQUIAM, WASHINGTON.

VALVE FOR CYLINDERS.

Application filed November 6, 1924. Serial No. 748,242.

*To all whom it may concern:*

Be it known that I, HILMER OLSON, a citizen of the United States, and a resident of Hoquiam, in the county of Grays Harbor and State of Washington, have invented certain new and useful Improvements in Valves for Cylinders, of which the following is a specification.

My invention relates to improvements in valves, more particularly to a valve for controlling passage of a pressure fluid from a source of supply to a cylinder and the exhaust of the pressure fluid from the cylinder, and it consists in the combination, constructions and arrangements herein described and claimed.

An object of the invention is to provide a simple, reliable and efficient valve of the character described which is constructed in such manner that pressure fluid under any ordinary pressure cannot escape past the relatively moving parts thereof during the operation of the valve.

A further object of the invention is to provide a valve of the character described which is easy of operation and in which the relatively moving parts will not stick to one another.

Other objects and advantages will be apparent from the following description, considered in conjunction with the accompanying drawings, in which, Figure 1 is a longitudinal vertical section through a valve embodying the invention, Figure 2 is a section on the line 2—2 of Figure 1, Figure 3 is a section on the line 3—3 of Figure 1.

The improved valve comprises a tubular casing 1 having counterbores 2 and 3 respectively extending from opposite ends of the tubular casing considerable distances longitudinally of the casing. The counterbores 2 and 3 constitute valve chambers. The bore of the casing 1 is indicated at 4 and the wall thereof is merged at its opposite ends by tapering outwardly enlarging shoulders 5 and 6 respectively into the walls of the counterbores 2 and 3 respectively. The tapering shoulder 6 serves as a valve seat for a ball valve 7 which is urged to position against its seat by an expansion spring 8, the latter being confined within the valve chamber 3 between the ball valve 7 and the bottom wall of a socket 9 in the inner end of a plug 10 which is threaded into the end portion of the counterbore 3.

An opening 11 extending radially from the wall of the counterbore 3 through the outer wall of the tubular casing 1 is threaded for engagement with an end portion of a supply pipe 12 which may lead from any suitable source of pressure fluid supply. The opening 11 of course is located outwardly of the valve seat 6 and the supply tube 12 therefore communicates with the valve chamber 3 between the valve 7 and the plug 10.

An annular groove 13 in the wall of the bore 4 inwardly of the valve seat 6 is in communication with a radial opening 14 which extends through the outer wall of the casing 1 and is threaded for engagement with an end portion of a delivery tube 15 which may lead to the intake side of any suitable pressure fluid cylinder, none being shown in the drawings. Also, the counterbore 2 may be provided with an annular groove 16 at the outer end of the tapering valve seat 5. This groove 16 is in open communication with a radial opening 17 which extends through the wall of the casing 1 and is threaded for engagement with an end portion of an exhaust tube 18 of said cylinder, the exhaust tube being adapted to conduct pressure fluid from the cylinder to the valve chamber 2. A tapering valve 19 adapted to have a fluid tight contact with the valve seat 5 preferably has a flat outer face and is integral with a valve stem 20 which extends loosely through the bore 4 and has a reduced end portion 21 in contact at its extremity with the ball valve 7, said reduced end portion being concavely curved at its extremity to conform to the curvature of the ball valve 7. The stem of the valve 19 is of such length that the valve 19 will be held partly away from the seat 5 when the ball valve 7 is seated, while the valve 7 will be held slightly away from its seat against the action of the spring 8 when the valve 19 is held against the seat 5.

A ball valve 22 is loosely disposed in the valve chamber 2 just beyond the outer end of the valve 19. A tubular valve seat member 23 extends slidably through a stuffing box generally indicated at 24 which closes the valve chamber 2 at the outer end of the latter. The tubular valve seat member has the inner end wall thereof concavely curved as indicated at 25 to closely contact with the periphery of the ball valve 22, so that escape of pressure fluid between the ball valve 22 and the valve seat which is defined by the concavely curved end wall 25 of the valve seat member is prevented when the ball valve 22 is in contact with its seat.

The valve seat member 23 is provided with a lateral outlet adjacent its outer end which may be a slot as indicated at 26 and is adapted at its outer end for connection with any suitable operating means or source of power (this not being shown) whereby the valve seat member 23 may be moved axially for a purpose to be presently described.

The stuffing box 24 may comprise a tubular body 27 having an end portion for threaded engagement with the adjacent end portion of the valve casing 1. The bore of the tubular body 27 extends from the inner end thereof only part way through the tubular body and then is merged into a counterbore 28 by a tapered shoulder 29. Compressible packing 30 may be placed in the counterbore 28 around the valve seat member 23 which extends slidably through the bore of the tubular body 27 and may be compressed against the shoulder 29 by a packing gland 31 which will be moved toward the shoulder 29 when a nut 32 is screwed on the outer end portion of the tubular body 27. The nut 32 has a central opening through which the tubular valve seat member 23 extends.

The body 27 of the stuffing box is provided with one or more radial notches 33 in its inner end and the diameter of the bore of the tubular body 27 of the stuffing box is slightly less than the diameter of the ball valve 22.

From the foregoing description of the various parts of the device, the operation thereof will be readily understood. The ball valve 7 is normally held against its seat both because of the action of the spring 8 and by pressure from the supply tube 12. When the valve seat member 23 is moved axially inward, motion will be transmitted therefrom through the valve 22, the valve 19, the valve stem 20—21 to the ball valve 7 which will be moved from its seat against the action of the spring 8 while the valve 19 will be moved against the valve seat 5. Pressure fluid then will flow from the tube 12 through the valve compartment 3 into the bore 4 of the valve casing and thence through the delivery tube 15 to the intake of the cylinder to which the tube 15 is connected. As soon as the valve seat member 23 moves outward a sufficient distance, the ball valve 7 will return to position against the seat under the action of the spring 8 and pressure fluid from the tube 12. Sufficient pressure fluid will remain in the bore 4 and valve chamber 2 at all times to hold the ball valve 22 against its seat 25 so long as the valve seat member 23 is extended into the valve compartment 2.

Therefore, flow of pressure fluid from the compartment 2 into the bore of the tubular valve seat member 23 is prevented until the valve seat member 23 has been moved axially outward beyond the inner end of the tubular stuffing box 27, after which, the engagement of the ball member 22 with the end of the tubular stuffing box 27 will permit the valve seat member 23 to move slightly outward from the ball valve 22 and pressure fluid can escape from the compartment 2 through the notches 33 into the bore of the valve seat member 23 and thence through the outlet 26 of the valve seat member to the atmosphere or to any other desirable place. Escape of pressure fluid from the exhaust tube of the cylinder through the compartment 2 and the tubular valve seat member 23 during each cycle of operation of the cylinder with which the tubes 15 and 18 are connected thus is permitted.

From the foregoing it will be apparent that the relatively moving parts of the device will not bind against one another or stick during the operation of the valve and that leakage of pressure fluid from the valve will be prevented.

It is to be understood that I consider as my own all such modifications and adaptations of the device which is illustrated in the drawings and described in the foregoing specification as fairly fall within the scope of the invention as defined in the appended claims.

I claim:—

1. A valve comprising a tubular casing having a pair of valve compartments at the opposite ends thereof and a passage extending between and connecting said valve compartments, said valve compartments having seats for valves at their adjacent ends, each valve compartment having an inlet and one of said valve compartments having an outlet, said tubular casing also having an outlet communicating with said passage intermediate of said valve seats, two valves respectively disposed in said compartments for engagement with said seats, motion transmitting means between said valves for holding one of said valves away from its seat when the other of said valves is in engagement with its seat, and means for controlling flow of fluid through the outlet of said one valve compartment.

2. A valve comprising a tubular casing having a pair of valve compartments at the opposite ends thereof and a passage extending between and connecting said valve compartments, said valve compartments having seats for valves at their adjacent ends, each valve compartment having an inlet and one of said valve compartments having an outlet, said tubular casing also having an outlet communicating with said passage intermediate of said valve seats, two valves respectively disposed in said compartments for engagement with said seats, motion transmitting means between said valves for holding one of said valves away from its seat when the other of said valves is in engagement with its seat, means for controlling flow of fluid through the outlet of said one valve compartment, and spring means urging one of said valves to position to engage with its seat.

3. A valve comprising a tubular casing having a pair of valve compartments at the opposite ends thereof and a passage extending between and connecting said valve compartments, said valve compartments having seats for valves at their adjacent ends, each valve compartment having an inlet and one of said valve compartments having an outlet, said tubular casing also having an outlet communicating with said passage intermediate of said valve seats, two valves respectively disposed in said compartments for engagement with said seat, motion transmitting means between said valves for holding one of said valves away from its seat when the other of said valves is in engagement with its seat, means for controlling flow of fluid through the outlet of said one valve compartment, and spring means urging one of said valves to position to engage with its seat, said means for controlling flow from the outlet of said one valve compartment being operable to cause movement of said spring-pressed valve from its seat.

4. A valve comprising a tubular casing having counterbores at the opposite ends thereof defining valve chambers, the bore of said casing connecting said counterbores being merged at its opposite ends into the counterbores by outwardly enlarging tapering valve seats, a closure for the outer end of one of said valve compartments, said one valve compartment having a lateral inlet, a ball valve in said one valve compartment, a spring urging said ball valve against its seat, said valve casing having a lateral outlet communicating with the bore of the casing intermediate of said counterbores, a valve disposed in the second of said valve compartments for engaging with the valve seat at the inner end of the counterbore, said last named valve having a stem rigid therewith extending slidably through the bore of the casing and engaging said ball valve, whereby said ball valve will be moved from its seat when such second named valve is in engagement with its seat, said second valve compartment having an inlet and outlet, and means for controlling flow through the outlet of said last named valve compartment.

5. A valve comprising a tubular casing having counterbores at the opposite ends thereof defining valve chambers, the bore of said casing connecting said counterbores being merged at its opposite ends into the counterbores by outwardly enlarging tapering valve seats, a closure for the outer end of one of said valve compartments, said one valve compartment having a lateral inlet, a ball valve in said one valve compartment, a spring urging said ball valve against its seat, said valve casing having a lateral outlet communicating with the bore of the casing intermediate of said counterbores, a valve disposed in the second of said valve compartments for engaging with the valve seat at the inner end of the counterbore, said last named valve having a stem rigid therewith extending slidably through the bore of the casing and engaging said ball valve, whereby said ball valve will be moved from its seat when said second named valve is in engagement with its seat, said second valve compartment having a lateral inlet, a ball valve in said second valve compartment resting upon the other valve in said second named compartment, a stuffing box attached to said valve casing at the outer end of said second valve compartment, a tubular valve seat member slidable in said stuffing box, said valve seat member being formed at its inner end to provide a valve seat for engagement with said last named ball valve and for transmitting motion through said last named ball valve to the other valve in said second valve compartment, said valve seat member having an outlet opening beyond the outer end of said stuffing box and being movable to position the inner end of the valve seat member outwardly of the inner end of the stuffing box, said stuffing box having a notch in its inner end through which fluid may pass around said last named ball valve when the inner end of the valve seat member is outwardly of the inner end of said stuffing box.

6. In a valve of the character described, a casing defining a valve chamber provided with an outlet opening and with an inlet, a stuffing box having a tubular portion secured in said outlet opening, said tubular portion of the stuffing box having a notch in its inner end, a ball valve within said valve chamber, a tubular valve seat member extending slidably through said stuffing box, the inner end of said tubular valve seat member being formed to provide a seat for said ball valve, said ball valve being of greater diameter than the inner diameter of the inner end of said tubular portion of the stuffing box, said valve seat member having an outlet outwardly of the stuffing box and being slidable axially in the stuffing box from position to extend at its inner end beyond the inner end of the stuffing box and in contact with said valve to position outwardly of the inner end of the stuffing box and out of contact with said valve.

HILMER OLSON.